Aug. 20, 1957     R. L. CARLSON     2,803,261
VELOCITY RESPONSIVE CONTROLS
Filed Feb. 2, 1953
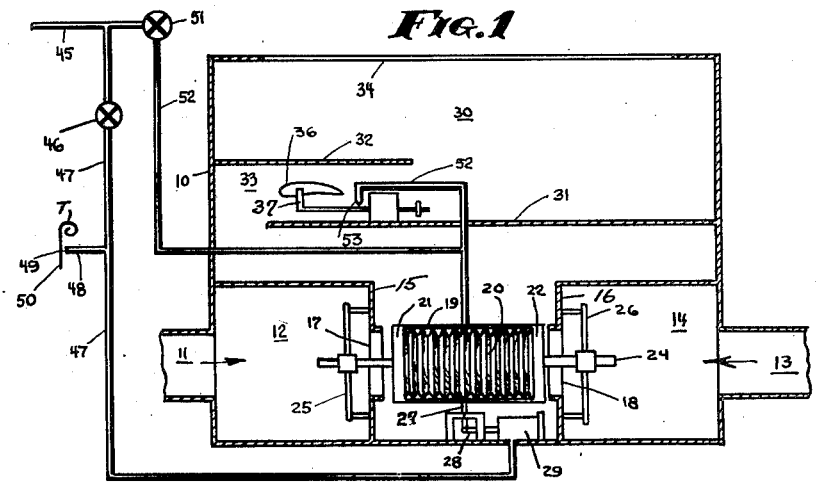
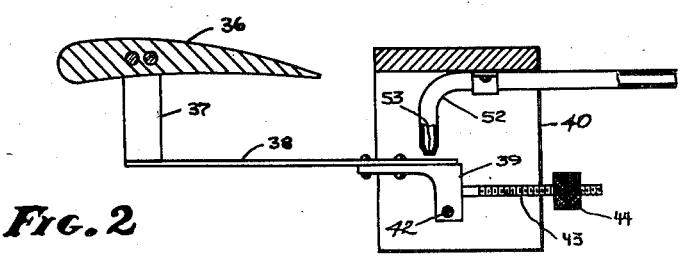
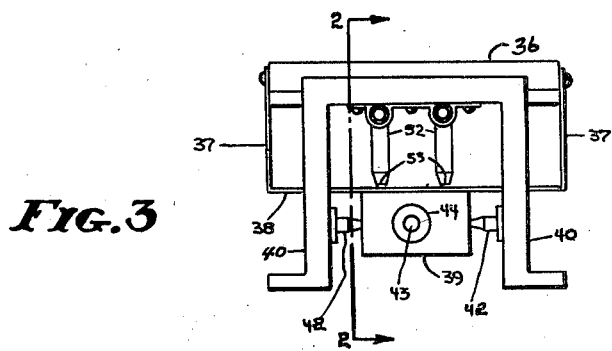
INVENTOR.
Raymond L. Carlson
BY Robert J. Palmer
Attorney United States Patent Office 2,803,261
Patented Aug. 20, 1957

2,803,261

VELOCITY RESPONSIVE CONTROLS

Raymond L. Carlson, West Roxbury, Mass., assignor to Westinghouse Electric Corporation, East Pittsburgh, Pa., a corporation of Pennsylvania Application February 2, 1953, Serial No. 334,650

1 Claim. (Cl. 137—114)

This invention relates to air conditioning systems and apparatus, and relates more particularly to controls responsive to changes in the velocity of conditioned air for adjusting dampers for regulating the flow of conditioned air.

As described in the co-pending application of John E. McDonald, Serial No. 327,360, filed December 22, 1952, when local air distributing units are supplied with conditioned air under pressure from a central air conditioner, load changes may cause the volume of air supplied from a supply duct to the units, to vary beyond the dampering variations provided by local thermostats. Since it is desired in systems of this type that such units deliver constant air volumes, it is necessary to provide additional controls responsive to air volume variations for maintaining a constant air volume from each unit. Pressurestats have been used in ducts for adjusting fans for providing constant air volumes through the ducts, but since the pressure built up in an air distributing unit is small, and the variations in pressure caused by the usual air volume changes is small, pressurestats are not satisfactory for controlling the air volumes passing through such units.

This invention provides a sensitive control responsive to changes in air velocity caused by changes in the volume of air passing through an air distributing unit. In one embodiment of the invention, an airfoil section is pivoted in a constricted passage in an air distributing unit, through which passage the air to be delivered by the unit is caused to flow. An inflatible volume control damper may be used and supplied with compressed air through a tube having a branch forming a bleed port adjacent a flat strip carried by the airfoil section and movable therewith. When an increase in air volume occurs, the resulting increase in air velocity in the constricted passage in which the airfoil is pivoted, will cause the airfoil to lift and to move the flat strip nearer the bleed port. This will result in less bleeding of compressed air from the bleed port, and in an increase in pressure in the inflatible damper, causing the damper to inflate further and to offer more resistance to the air flowing through the unit. On a reduction of air volume below normal the reverse action will occur.

An object of this invention is to provide a dampering control including a member responsive to air velocity changes.

Another object of this invention is to provide a dampering control including a pivoted airfoil section in a constricted air passage.

This invention will now be described with reference to the drawing, of which:

Fig. 1 is a side elevation in section, of an air distributing unit embodying this invention;

Fig. 2 is an enlarged side elevation, in section, of the pivoted airfoil control of Fig. 1; and Fig. 3 is an end elevation of the control of Fig. 2, looking at the end opposite the airfoil section.

The air distributing unit illustrated by Fig. 1 has a relatively long, relatively narrow casing 10 and is generally similar to the unit disclosed in the copending W. C. Jones application, Serial No. 249,085, which has matured into Patent No. 2,727,454. The casing 10 has a warm air inlet 11 into the warm air plenum chamber 12 in the lower portion of the unit, and has a cool air inlet 13 into the cool air plenum chamber 14 located opposite the chamber 12. The two chambers 12 and 14 are spaced apart at the longitudinal center of the unit, and have spaced-apart, vertically extending inner walls 15 and 16 respectively, and which have the aligned, circular outlet openings 17 and 18 respectively, therein.

The cylindrical sleeve 19 has an inflatible bellows 20 therein, and which has at its ends the circular damper plates 21 and 22. The sleeve 19 is supported on the shaft 24 which, in turn, is supported by the supports 25 and 26 within the chambers 12 and 14 respectively. The sleeve is attached by the lever 27 to the piston 28 of the air cylinder 29.

The casing 10 has a warm and cool air mixing chamber 30 above the plenum chambers 12 and 14, and within the lower portion of this mixing chamber there are arranged the horizontally extending walls 31 and 32 which form therebetween together with the side walls of the casing, a constricted passage 33 for causing an increase in the velocity of the air flowing from the plenum chambers into the mixing chamber. The casing has an air outlet 34 above the mixing chamber.

An airfoil section 36 of wood or other suitable material, is attached at its ends to the vertically extending metal strips 37 which are joined at their lower ends to one end of the longitudinally extending metal strip 38. The strip 38 is attached at its other end to the support 39 which is pivoted to the pivots 42 which extend inwardly from the supporting bracket 40 which is attached to the wall 31. The support 39 has a threaded rod 43 extending therefrom at the opposite side of the support from that supporting the strip 38, and has the counterweight 44 threaded onto the rod 43 for exactly balancing the weight of the airfoil section and its supporting structure carried by the pivots 42.

The compressed air supply tube 45 connected to a conventional source of compressed air which is not illustrated, is connected through the pressure reducing valve 46 and the branch tube 47 to the air cylinder 29. The branch tube 47 has a bleed tube 48 with a bleed port 49 across which is located the thermostat strip 50 of the thermostat T.

The compressed air supply tube 45 is also connected to the pressure reducing valve 51 and through this valve and the branch tube 52 to the air bleed tube 52 having the bleed ports 53 located adjacent the strip 38 of the velocity control comprising the airfoil section 36, and connected to the bellows 20.

Operation

Assuming the thermostat T is calling for heat, its strip 50 will move closer to the bleed port 49 causing less pressure loss through the bleed port so that the air pressure in the air cylinder 29 builds up causing its piston to be retracted so as to move the damper plate 21 away from the warm air outlet 17, and to move the damper plate 22 towards the cool air outlet 18. This will result in an increased volume of warm air and in a reduced volume of cool air.

It is desired to maintain a constant volume of air through the outlet 34 of the unit but the volume of air supplied into the unit depends not only upon the positions of the damper plates 21 and 22, but upon the air pressures in the warm and cool air ducts connected to the unit. It is difficult to maintain constant air pressures at the air inlets to such distributing units many of which are used in a typical system, and different ones of which usually require different proportions of warm and cool air resulting in unequal loads on the supply ducts and in unequal air pressures in the ducts at different units.

For maintaining a constant output volume regardless of air pressure changes at the inlets of a unit, an increase in air velocity at the airfoil section 36 caused by an increase in air volume through the unit, will cause the airfoil section to lift and to move the strip 38 nearer the bleed ports 53. This will cause a reduced pressure loss through the bleed ports 53, and will cause an increase in air pressure in the bellows 20 causing it to expand and to move both damper plates 21 and 22 towards their respective outlets 17 and 18, causing a reduction in the total volume of air passing through the unit.

Upon a decrease in air volume below normal, the reverse action will occur, and a greater volume of air will pass through the unit.

The counter-balance 44 may be adjusted to vary the angle of attack of the airfoil section 36 for varying its sensitivity and adjusting it to different operating conditions.

While one embodiment of the invention has been described for the purpose of illustration, it should be understood that the invention is not limited to the exact apparatus and arrangement of apparatus illustrated, since modifications thereof may be suggested by those skilled in the art without departure from the essence of the invention.

What is claimed is:

A conditioned air volume control comprising means forming a conditioned air passage and a pair of oppositely disposed ports for admitting air into said passage, a pair of dampers facing said ports, a bellows for moving, when inflated, said dampers towards said ports, an airfoil section pivoted in said passage in the path of the air flowing therethrough, means using air under pressure and including a compressed air supply and a supply pipe for inflating said bellows, a compressed air bleed port connected to said pipe, and means movable with said airfoil section for varying the volume of air bled from said bleed port.

References Cited in the file of this patent

UNITED STATES PATENTS

| 2,132,338 | Ziebolz | Oct. 4, 1938 |
| 2,149,934 | Carter | Mar. 7, 1939 |
| 2,174,965 | Burdick | Oct. 3, 1939 |
| 2,193,240 | Schmidt | Mar. 12, 1940 |
| 2,317,717 | Bauman | Apr. 27, 1943 |
| 2,427,235 | Smoot | Sept. 9, 1947 |

FOREIGN PATENTS

| 170,606 | Great Britain | Oct. 20, 1921 |
| 451,295 | Great Britain | Aug. 4, 1936 |